March 5, 1968 E. A. ANDERSON ET AL 3,371,926
DOCUMENT SORTING AND DISTRIBUTING SORTER APPARATUS
Filed Oct. 24, 1965 3 Sheets-Sheet 1
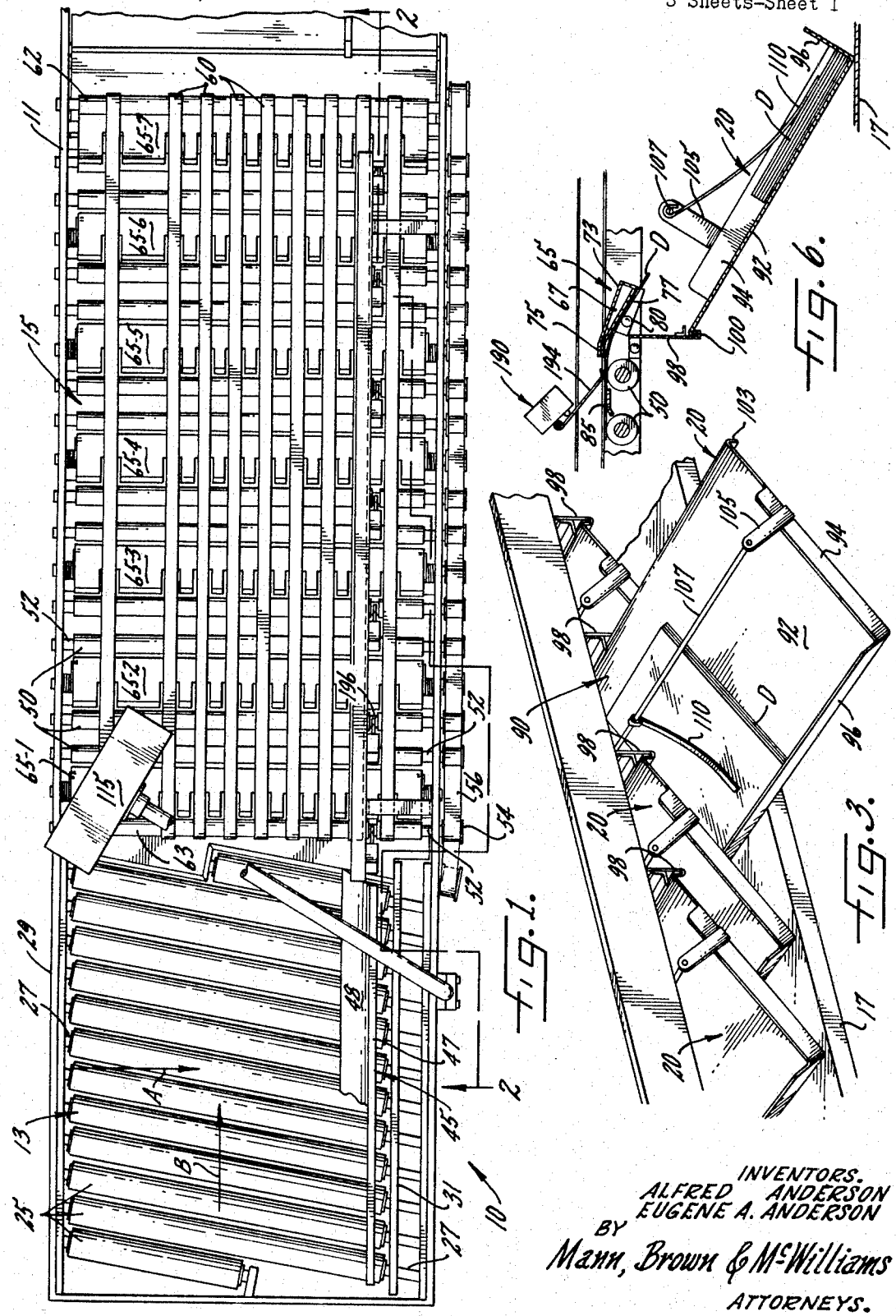
INVENTORS.
ALFRED ANDERSON
EUGENE A. ANDERSON
BY
Mann, Brown & M$^c$Williams
ATTORNEYS.

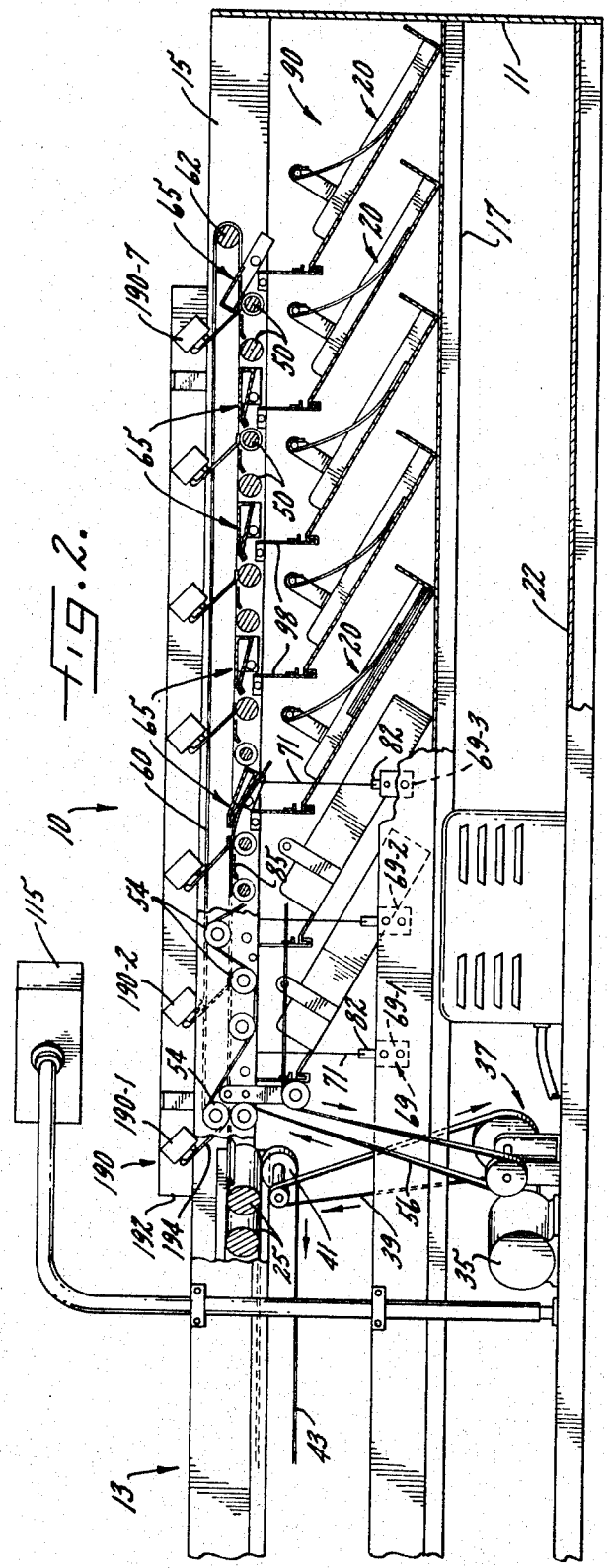

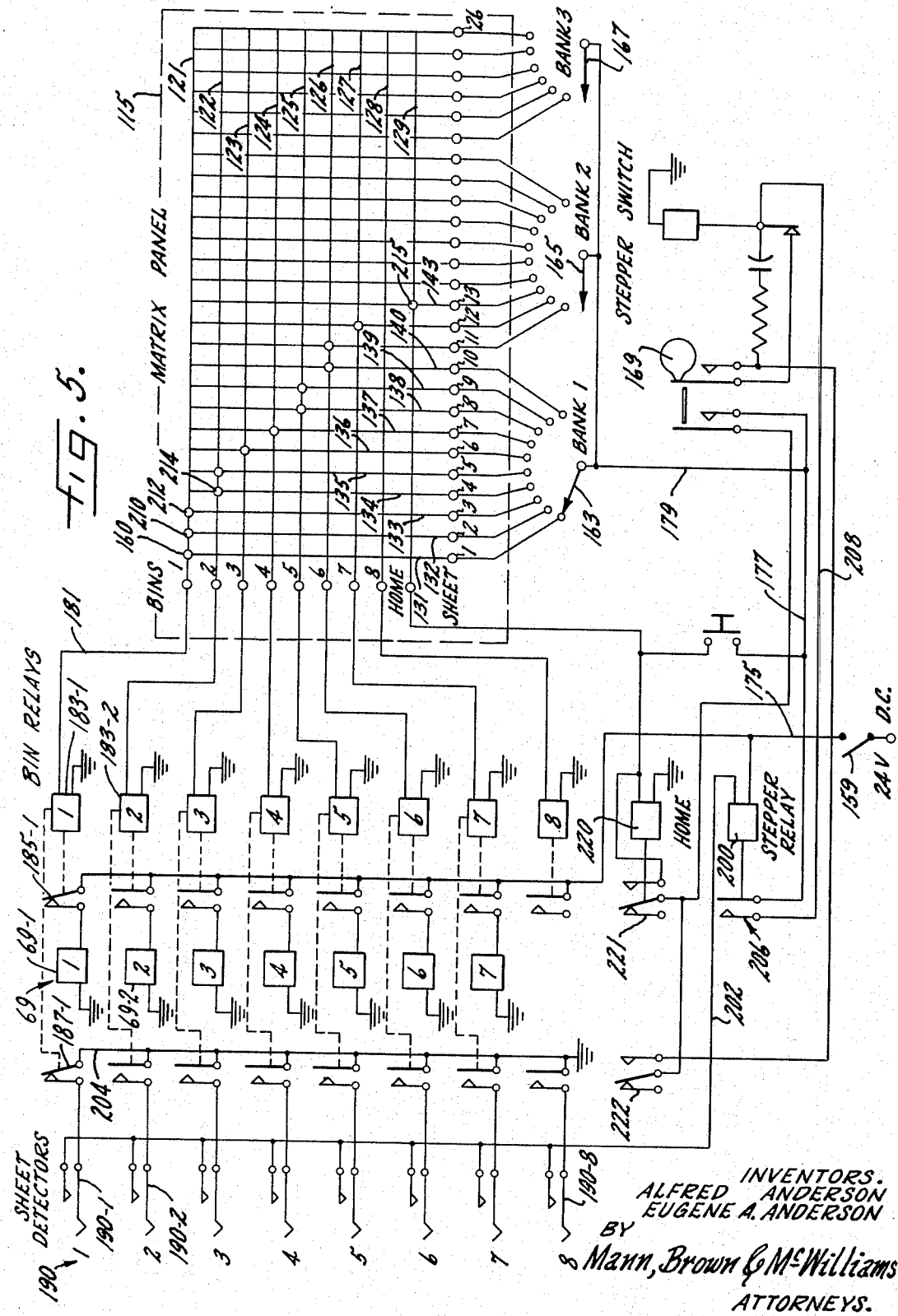

United States Patent Office 3,371,926
Patented Mar. 5, 1968

3,371,926
DOCUMENT SORTING AND DISTRIBUTING
SORTER APPARATUS
Eugene A. Anderson, 414 W. Taylor Road, Lombard, Ill., 60148, and Alfred Anderson, 460 S. York St., Elmhurst, Ill. 60126
Filed Oct. 24, 1965, Ser. No. 504,552
7 Claims. (Cl. 271—52)

The present invention relates to a device for automatically sorting and distributing a series of documents in accordance with a predetermined plan.

Documents of virtually any description, and even intermingled in terms of size and shape, are positively driven on a deck having a series of gates disposed therealong. Each gate guards the entrance to a bin for document storage.

Apparatus is provided for electronically programming the gates so that they will open in a predetermined sequence so as to permit a specified number of documents moving along the deck to pass therethrough. The documents are accurately and positively counted at the entrance and the gate is controlled by the counter so that it will remain open only until the specified number of documents to be received in the bin guarded thereby have actually been received.

The present invention relates to improvements in apparatus for receiving documents from a duplicating machine or the like and automatically sorting and distributing the documents in accordance with a predetermined program.

The apparatus which comprises the invention is adapted for use in conjunction with any of the familiar forms of duplicating devices including the faster devices such as mimeograph. It is an object of the present invention to provide apparatus which is capable of receiving, sorting and storing documents in predetermined segregated groups as quickly as the documents are ejected from the duplicating device producing such copies.

Another object of the invention is to provide an apparatus of the character described which is completely accurate and reliable in placing the precise number of documents called for in each segregated group. It is an objective, related to the preceding, to provide apparatus which may be quickly and easily programmed by anyone having average clerical skills to automatically provide the desired number of groups of documents as well as the precise number of documents in each group.

A further objective of the invention is to provide apparatus of a sensitivity which will permit counting of documents irrespective of the type of paper or surface used. Accordingly, the apparatus of the present invention will count, segregate, and store the heavier bond papers and the very light onion skin papers with equal facility, and, in fact, will perform with complete reliability even though different weights and grades of paper are used interchangeably in the same run. An object related to the foregoing is the precision of a high-speed document sorting device which will perform without curling, bending, or otherwise damaging the documents sorted and stored, irrespective of their weight or the character or grade of the paper involved.

It is another, and still further, objective of the invention to provide apparatus for receiving, sorting and storing documents in segregated groups which permits removal of a completed group of segregated documents at any time after the group has been completed, even though subsequent groups have not been completed and the machine is still running at a high rate of speed.

These, as well as other objects and advantages of the present invention, will become apparent from a reading of the detailed specification which follows hereinafter, taken in conjunction with the appended drawings, wherein:

FIG. 1 is a top elevation of apparatus constructed in accordance with the present invention;

FIG. 2 is a side elevation of the apparatus of FIG. 1, shown in partial section along lines 2—2 of FIG. 1;

FIG. 3 is an enlarged portion of the apparatus of the present invention illustrating the specific construction of a document-receiving tray;

FIG. 4 is a table showing an exemplary office distribution setup which will be used to illustrate the operation of the present invention;

FIG. 5 is a schematic layout of the electrical circuitry which operates the various mechanical elements of the machine of FIG. 1; and FIG. 6 is an enlarged partial section of the gate mechanism and associated tray.

While the invention is susceptible to various modifications and alternative constructions, a particular illustrative embodiment has been shown in the drawings and will be described below in considerable detail. It will be understood, however, that there is no intention to limit the invention to the specific form disclosed, such form being merely the preferred construction of the invention, and it is my intention to cover all modifications, alternative constructions and equivalents falling within the spirit and scope of the invention as expressed in the appended claims.

With particular attention now to the drawings and to FIGS. 1 and 2 thereof, the general layout of exemplary apparatus 10 constructed in accordance with the present invention is shown. More particularly, a frame 11 is provided which supports a receiving platform generally indicated at 13 and a distributing and depositing deck 15. An intermediate deck 17 is disposed beneath the deck 15 for supporting a plurality of document receiving trays 20. A lower deck 22 supports and stores the mechanical and electrical apparatus which drives the documents sorting mechanisms.

It will be appreciated that, depending upon the particular office setup in which the present invention is placed, the entire apparatus comprising the invention may be mounted upon the frame 11, which may be provided with casters or other means for moving the apparatus to a working position adjacent a duplicating machine or other device. With equal facility, the apparatus may be permanently installed to the floor or wall of any suitable space either adjacent to a duplicating machine which is likewise permanently installed, or adjacent a conveyor system which transports documents to be sorted from a duplicating machine or the like to the sorter.

Referring particularly to FIG. 1, the receiving platform of the present apparatus is, in keeping with the invention, constructed to permit documents to be fed onto the pltaform longitudinally and transversely as indicated by the arrows A and B. To this end, a plurality of rollers 25 are provided in closely spaced parallel relation. The rollers are relatively small in diameter and closely spaced, so as to minimize the depressions between them. This permits papers having very little body, such as onion skin, to be transported over the rollers without concern that the edges of the onion skin might pass between a pair of adjacent rollers rather than over the top of them.

The rollers 25 are provided with reduced end portions 27 which are appropriately mounted in bearing relation with respect to a frame member 29 on one side, and a longitudinal frame member 31 on the other. The rollers are, of course, mounted in appropriate bearings to minimize friction, and to this end, it will be appreciated that as an alternative, the rollers 25 may be of cylindrical construction and mounted on elongated rods which are secured to the frame 11 of the device with bearings between the rod and the internal diameter of the rollers.

In order to assure continuous, accurate positioning of each document as it is fed to the distributing and depositing deck, the axis of the rollers 25 is oblique with respect to the longitudinal flow of the documents (directional arrow B) across the depositing deck. The particular angle used, within limits, is a matter of choice, but it has been found that an angle of approximately 10 degrees from the vertical (as seen in FIG. 1) is highly effective.

Referring briefly to FIG. 2, there is shown an exemplary drive arrangement for the roller 25 which comprises any convenient electric motor 35 connected with a suitable transmission 37. A driving connection, in this instance by means of a belt 39, is provided between the transmission 37 and a speed reducing transmission 41. From the transmission 41, one or more belts 43 are driven, which belts engage the underside of the rollers frictionally for rotating the same. Rotation of the rollers is in the clockwise direction, as seen in FIG. 2, so as to urge documents deposited on the platform towards the distributing deck 15.

Because of the angular relationship of the rollers with respect to the longitudinal axis of the apparatus as a whole, documents dropped or otherwise deposited upon the receiving platform, irrespective of where on the platform they are dropped, are urged against an appropriate guide 45. The guide, in this case, comprises an upstanding guide wall portion 47 which is parallel to the longitudinal axis of the machine. The guide may be formed of a suitable straight piece of sheet metal, and is provided, at the top thereof, with an overhanging portion or canopy 48 to prevent documents from inadvertently jumping the upstanding guide wall portion 47.

Movement of the rollers in a clockwise direction forces every document deposited thereon against the guide wall portion, thereby aligning one edge of the document with the distributing and depositing deck. As a result, every document received by the machine is so aligned as to facilitate counting and depositing thereof.

The distributing and depositing deck 15 is constructed and arranged to receive a steady stream of aligned documents from the receiving platform, sort the documents and deposit them in neat, ready-to-use stacks. To this end, the deck is provided with a plurality of rollers 50. The rollers 50 lie in a flat plane, and the axis of each is parallel, and transverse to the longitudinal axis or flow of documents across the deck. Each of the rollers is, as indicated with respect to the rollers 25, provided with a reduced end portion 52 which is mounted in bearing relation with respect to the frame 11. One reduced end portion (in this instance towards the bottom of FIG. 1) is extended beyond the supporting frame member and is provided with a suitable pulley 54 for engagement with a drive belt 56. The drive belt 56 is connected with the transmission 37 and is so disposed about the drive pulleys of each of the rollers 50 that all are driven at precisely the same direction and at a speed which is, at all times, coordinated with the speed of the rollers 25 to permit the fastest possible receiving, sorting and depositing of documents.

The documents themselves, once aligned on the receiving platform, are propelled along the depositing deck by means of frictional engagement with a plurality of drive belts 60 which are disposed in spaced relation in the direction of flow of documents and mounted over a pair of drive members 62 and 63. The member 63 is connected with the transmission 37, thereby coordinating the speed of the drive belts 60 with rotation of the rollers 50 so as to maintain all documents passing between the two in a flat, unwrinkled manner. The above described coordinated drive arrangement permits optimum manipulation of the documents with no damage to the printed matter thereon or the condition of the document itself.

Further in keeping with the invention, a gate mechanism indicated generally by the numeral 65, and seen best in FIGS. 2 and 6, is provided between each pair of rollers 50. It will, of course, be appreciated that the number of rollers between each gate is a matter of efficient design and may be varied without departing from the invention. The gate mechanism 65, for the purposes of this description, comprises a movable gate member 67 and a solenoid 69 (FIG. 2) connected to the gate by means of a wire 71 for operating the same.

The gate 67 has a general right triangular profile, the opposite side of which, 73, is adapted to be parallel with the plane of the deck 15. The apex of the gate 75, defining the inner section of the adjacent side and hypotenuse of the triangular profile, is bent over slightly, downwardly and away from the plane of the deck 15. The hypotenuse 77 guides the document D through the gate when the gate is open (see FIG. 2) and the curved or bent construction of the apex 75 causes the gate to act to gently divert the document from its lateral path and guide it smoothly through the gate without danger of it jumping the gate and passing onward down the deck. The gate itself may be formed of a single piece of sheet metal appropriately bent as heretofore described, or in any other suitable fashion. It is mounted on an appropriate pivot pin 80, about which it is capable of being rotated by the action of the solenoid 69. For example, if the armature pin 82 is retracted (moved towards the solenoid 69, as seen in FIG. 2), the wire 71, which is connected at a point behind the pivot pin 80, pulls the gate downwardly and, therefore, rotates the same about the pivot pin to the position as seen best in FIG. 6. This represents the open, or document receiving position of the gate 67.

Again referring to FIG. 2, a spanner plate 85 is provided between pairs of rollers 50. The use of such a plate permits the number of rollers required to maintain a relatively flat plane of travel for the documents to be reduced.

Once a gate opens, a document is gently guided, by means of the guide surface 77, through the floor of the deck 15 and downwardly into a bin or hopper area indicated generally at 90, in which a tray 20 is mounted.

Referring particularly to FIG. 3, it is a feature of the present invention that once all the documents programmed for a particular basket or tray have been received therein, they may be removed, without disturbing the operation of the machine. To this end, each tray 20 comprises a relatively flat sheet 92, positioned below a gate 67 and disposed at an appropriate acute angle with respect to the intermediate deck 17, upon which it is partially supported, so as to receive a document passing through the gate with a smooth motion which permits a number of documents to be received, one on top of the other, in a tray neatly and without danger of wrinkling, folding or other damage to any one of the documents involved. The flat sheet is flanged as at 94 on its sides, and as at 96 at the bottom thereof. This arrangement facilitates the stacking of documents within the tray.

Each tray is, itself, partially supported by a depending support member 98 (FIGS. 3 and 6) which is suitably formed of sheet metal and provided with a channel section 100 adapted to receive a depending lip 103 defining a rail on the tray or basket 20. The bottom edge of the sheet 92 rests slidably upon the floor of the deck 17.

Each tray is provided with a handle formed of an upstanding pillar 105 attached to the flange 94 on each side of the member 92 and having a rod 107 standing between the pillars. In order to maintain the documents D deposited in each tray in a neat stack, a leaf spring 110 is attached to the rod 107 and applies light pressure to the stack of documents (see FIG. 3) on the tray.

Each individual tray 20 is slidable transversely to the axis of the deck, from its position beneath the gate in the deck and to a position where the documents D therein may be removed by hand by simply slipping them from beneath the spring 110. The depending lip 103 slides easily in the channel section 100 thereby permitting the basket to be moved into the position of FIG. 3 without changing its orientation with respect to the deck in terms of its function as a repository for documents falling through the gate. As stated, once a tray has received all the documents which have been programmed for it, those documents may be removed by simply sliding out the tray without, in any way, impairing the continuing operation of the machine as it fills other trays with a preselected number of documents.

A significant characteristic of the present invention is the simplicity with which it may be programmed to provide, with unexcelled reliability, a precise number of any kind of document in a given tray. As a convenient vehicle for describing the programming and counting features of the invention, and demonstrating its operation, FIGURE 4 is provided, and is a chart, which is largely self-explanatory, of what might be a typical distribution matter desired for a particular document, or set of documents. The left hand column designates the particular department or destination and the adjacent column the number of copies of the document that that particular department or destination has to receive. The remaining columns of the chart relate more particularly to the schematic diagram of FIG. 5 of the drawing, and with particular reference to the matrix panel shown schematically at the right of that diagram.

In keeping with the invention, the programming of the particular distribution of documents is greatly simplified so as to be understandable to average clerical personnel having no particular technical background. To this end, the matrix panel, which is shown schematically in FIG. 5, is mounted in a box 115. The face of the box is rectangular, and is provided with a column on the left hand side indicating the number of bins from 1 through 8. In a line across either the top or the bottom of the box there is provided numbers from 1 to, in the present instance, 26, relating to the number of sheets which may be distributed. It will be appreciated that the number of bins, as well as the number of sheets to be distributed, may be varied in accordance with need.

Referring to FIG. 5, just behind the face of the panel there are provided, in a plane, a plurality of wire conductors. The wire conductor corresponding to bin 1 bears the number 121. That corresponding to bin 2 bears the number 122; bin number 3—123; bin number 4—124; bin number 5—125; bin number 6—126; bin number 7—127; bin number 8—128; and the home position, 129. In a like manner, in a plane, which may be either behind or in front of the plane of the conductors 121 through 129, there are a series of conductors, one for each sheet to be distributed by the machine. Thus, sheet number 1 bears the number 131; that for sheet number 2 bears the number 132; 133 designates the conductor for sheet number 3, 134 for sheet number 4, 135 for sheet number 5, 136 for sheet number 6, 137 for sheet number 7, 138 for sheet number 8, etc. up to 26 in this example.

At the approximate intersection (as viewed at FIG. 5) of every pair of conductors, there is an aperture in the face of the matrix panel. A plurality of conducting elements such as metal probes or pins are adapted for insertion in these apertures, and by so doing, an electrical connection is made between the crossed conductors at that particular intersection.

Referring to FIG. 4, therefore, it is seen that three copies of the document to be distributed are to go to the customer (mailing). In order to place this number of copies in a particular hopper or bin, such as bin 1, a pin is placed in the socket or aperture corresponding respectively to the intersection between the conductor for bin 1 (121) and each of the conductors for sheets 1, 2 and 3 (131, 132 and 133 respectively). Again referring to the chart of FIG. 4, it is seen that two copies are desired for the accounts receivable department. These two copies may be placed in hopper number 2 by placing a probe at the intersection of both the conductor for bin number 2 (122) and the conductor for documents 4 and 5 respectively (134 and 135). Thus, it is only necessary to know the particular distribution that is desired for a document being duplicated, and that distribution may be set up on the matrix board by simply placing a probe for each document to be distributed in the particular socket corresponding to the bin in which the document is to be received. It is possible, as will now be appreciated, to put any number of documents from zero to the maximum number to be duplicated in any one of the bins, or any combination of the bins.

Still referring to FIG. 5, it will now be appropriate to follow the electromechanical process by which the device of the present invention accomplishes accuracy of distribution. As shown in FIG. 5, the electrical system is rendered operative, in this exemplary case, by connecting it to a source of 24 volts direct current by means of any appropriate switch 159. FIG. 5 is shown in a position to deposit sheet No. 1 in bin 1 of the machine. To this end, a probe is in the socket 160 at the intersection of conductors 131 and 121 respectively. The stepper switch shown at the base of the matrix board in FIG. 5 is of a known construction having a stepper mechanism comprising one or more rotatable conductors such as that indicated at 163 adapted to engage one end of the representative conductors 131 through 140 of bank 1. In a like manner, a stepping conductor 165 is provided to selectively engage the various conductors in bank 2, and in the construction shown, a third stepping conductor 167 is provided for bank 3. The stepping conductors are each connected to a cam 169 which is rotated in response to operation of the various elements of the system, as will now be described.

With the stepping conductor, for the bank number 1 (163) engaged with the end of the conductor for sheet number 1 (131) and the switch 159 closed to energize the circuit, current is passed through line 175, 177 and 179, through the conductor 163 and to the conductor 131. With a metallic probe in place in the socket 160, electrical connection is made between the connector 131 and 121, thus causing current to pass into line 181 thereby energizing a relay coil 183-1. Energization of the coil 183-1 causes points 185-1 to close, which in turn causes the solenoid connected to the gate which opens to bin number 1, here designated as solenoid 69-1 to be energized thereby causing gate number 1 to open. A second set of points, 187-1 is likewise closed. For convenience, parts specifically relating to bins 1 through 8 are identified by a number and a suffix corresponding to the bin to which the part relates. Thus, each solenoid, for example, is generally identified as 69, and the solenoid-operating gate for bin 1 is 69-1.

With the gate to bin number 1 now open, the first document fed from the receiving platform to the distributing deck will engage the surface 77 of the gate and be guided into bin number 1 (see FIG. 6). The procedure repeats for each document designated for that bin.

Referring more particularly to FIG. 2, in accordance with the present invention, a highly accurate counting mechanism is provided which counts the number of documents passing into a given bin with complete accuracy and signals that the document has arrived in the bin only after it has passed through the gate thereto. In accordance with this aspect of the invention, a plurality of microswitches indicated generally by the identifying character 190, and more particularly by numbers 190-1 for bin number 1, 190-2 for bin number 2, and so on through 190-8 for bin number 8, are provided, mounted to an appropriate rail 192 affixed to the frame 11 of the device. Each switch is provided with an elongated contact arm 194 which rests upon the roller disposed immediately before the particular gate for which the switch functions.

In order to provide optimum sensitivity to any type or thickness of paper to be distributed by the device, each roller which is engaged by a microswitch is notched as at 196 (FIG. 1), thereby increasing the permissible movement of the contact arm 194 and making the switch sensitive to even the very thinnest of sheet stock.

As the first document passes beneath the microswitch 190–1, the contact points (FIG. 5) are closed by upward movement of the arm 194–1 on the document D, causing current to flow through the stepper relay 200, through the line 202 and the contact points of the switch 190–1, through the contact points 187–1 and to ground through line 204. Energization of the stepper relay causes points 206 to be closed, sending current through line 208 to the stepper switch.

It is characteristic of the particular stepper switch shown, that energization in the manner just described causes the switch to cock, without actually rotating the cam 169. Not until the particular document passing under the microswitch 190–1 has completely cleared the switch, and therefore passed into the bin number 1, and the points of the microswitch are open to de-energize the stepper relay, does the switch actually operate to rotate the cam 169 to cause the rotating conductor 163 to step from position 1 to position 2. The stepper switch, having thus stepped the conductor 163 to a position in contact with the conductor 132, the process just described is again repeated.

A probe, in accordance with the program set up in FIG. 4, is placed in the socket 210 at the intersection of conductors 132 and 121, and again the relay 183–1, and 187–1 are energized. The gate 65–1 which opens into bin number 1 is likewise energized and open. As the sheet or document passes the detector 190–1, the stepping conductor 163 is stepped over to document number 3. A probe, in accordance with the program, has been placed in socket 212 at the intersection of conductors 133 and 121, and again the gate before bin number 1 is energized for receipt of the third document passing over the distributing deck.

Upon stepping the conductor 163 again, and with a probe, in accordance with our program, in socket 214 at the intersection of conductors 134 and 122, the relay 183–2 is energized and the solenoid 69–2 for bin number 2 is actuated and the associated gate 65–2 opened for receipt of the fourth document passing from the receiving platform over the distributing deck. Gate number 1 remains closed, and the document passes smoothly over gate number 1 and into bin number 2. The three documents now in bin number 1 may be removed by the operator by simply sliding the tray 20–1 forwardly as shown in FIG. 3, and removing the documents from beneath the spring 110.

Because of the particular stepper switch used, and because at any given time, it may be desirable to distribute less than the total number of documents which the machine is capable of distributing, in the illustrated case 26, it is necessary to return the stepper switch to its initial operating position after distribution of the last document to be received by the device. Accordingly, a "home" position is provided on the matrix board to reset the machine for a new program.

In accordance with the program set up in FIG. 4, twelve documents are to be distributed. Therefore, a probe is inserted in socket 215 at the intersection of conductors 143 and 129. When the stepping conductor 165 reaches the end of conductor 143, current passes through conductor 143 to conductor 129 and directly to a homing relay 220, which is connected, through contact points 221 and 222 directly to the stepper switch, causing the same to step the conductors around to the position as shown in FIG. 5 with the stepping conductor 163 in position against conductor 131 and the remaining stepping conductors in a non-operative position.

Thus, documents may be taken directly from a duplicating machine without ever being touched by human hands, and sorted and distributed into neat, quickly obtainable, stacks for mailing or other processing. All this may be accomplished with the aid of available clerical help without requiring technical know-how. Programming of the machine is easily understood and simply accomplished, and the operation of the machine is highly accurate and reliable.

We claim as our invention:

1. Apparatus for receiving, automatically sorting and depositing documents directly from a source comprising, in combination, a receiving platform adapted to align documents placed thereon in a single file and feed the so aligned documents for sorting and depositing; an elongated sorting and depositing deck adjacent said receiving platform so as to receive documents therefrom, said deck having a plurality of normally closed gates, each defining the entrance to a bin for segregating documents, means for automatically opening a particular gate to receive a predetermined number of documents, means disposed near the entrance to each bin and connected with each said gate for counting documents passed therethrough and for closing said gate when the proper number of documents have so passed, and means for moving said documents in a single file along said deck to an open gate.

2. A device as set forth in claim 1 wherein the receiving platform comprises a plurality of rotatable rollers disposed on an oblique axis with respect to said depositing deck, and a guide adjacent said rollers adapted to engage documents moved by said rollers so that all documents placed on said platform are moved therefrom in a single file.

3. Apparatus for receiving, automatically sorting and depositing documents directly from a source comprising, in combination, a receiving platform having a plurality of power driven rollers adapted to align documents placed thereon in a single file and feed the so aligned documents for sorting and depositing, an elongated sorting and depositing deck adjacent said receiving platform so as to receive documents therefrom, said deck having a plurality of normally closed gates, each defining the entrance to a bin for segregating documents, a movable tray disposed beneath each said gate in said bin for collection of documents in an orderly manner, means for automatically opening one gate at a time to permit passage of a predetermined number of documents therethrough, means disposed near the entrance to each bin and connected with each said gate for closing said gate when the proper number of documents have passed therethrough, each said try being slidable from said bin for removing documents stacked therein at any time during or after operation of the apparatus, and means for moving said documents in a single file along said deck to an open gate.

4. Apparatus for receiving, automatically sorting and segregating documents directly from a source comprising, in combination, a receiving platform having a plurality of power driven rollers adapted to align documents placed thereon in a single file and feed the so aligned documents for sorting and segregating, an elongated sorting deck adjacent said receiving platform so as to receive documents therefrom, said deck having a plurality of normally closed power gates, each defining the entrance to a bin for segregating documents, means for selectively establishing a power path for opening each said gate for receipt of a predetermined number of documents therethrough, a counter disposed near the entrance to each bin and connected with each said gate for breaking said power path for closing said gate after the predetermined number of documents have passed therethrough, and means for moving said documents in a single file along said deck to an open gate.

5. Apparatus as set forth in claim 4 wherein solenoids are provided for operating said gates, and said solenoids being actuated by selective engagement with a preselected electric circuit.

6. The apparatus as set forth in claim 4 wherein each said gate is formed with a top wall which is flush with said deck when said gate is closed, and a guide wall attached to said top wall near the trailing edge thereof and extending downwardly at a small acute angle from said top wall, said guide wall adjusted to engage the leading edge of the document and guide the same into the associated bin.

7. Apparatus for receiving, automatically sorting and segregating documents directly from a source comprising, in combination, a receiving platform having a plurality of power driven rollers adapted to align documents placed thereon in a single file and feed the so aligned documents for sorting and segregating, an elongated sorting and depositing deck adjacent said receiving platform so as to receive documents therefrom, said deck having a plurality of normally closed serially spaced power gates, each defining the entrance to a bin for segregating documents, a slidable tray in each said bin for removal of documents directed thereto, means for selectively establishing a power path for opening each said gate for receipt of a predetermined number of documents therethrough, an individual counter disposed in proximity to the entrance of each bin and connected with each said gate for breaking said power path to thereby close said gate after the predetermined number of documents have passed therethrough, and means for moving said documents in a single file along said deck to an open gate.

References Cited
UNITED STATES PATENTS

| | | | |
|---|---|---|---|
| 1,543,354 | 6/1925 | Zacher | 271—52 |
| 2,492,386 | 12/1949 | Little | 271—64 |
| 2,742,286 | 4/1956 | Williams et al. | 271—64 |
| 2,891,667 | 6/1959 | Truver | 209—88 |
| 3,193,279 | 7/1965 | Campbell | 270—58 |
| 3,269,719 | 8/1966 | Hoff | 270—58 |

ALLEN N. KNOWLES, *Primary Examiner.*